United States Patent [19]
Heitkamp et al.

[11] Patent Number: 5,781,378
[45] Date of Patent: Jul. 14, 1998

[54] FLEXURE HAVING DISPLACED GIMBAL BOND TONGUE WITH END TERMINATED HEADS

[75] Inventors: Gary L. Heitkamp, Plymouth; Lee A. Northouse, Bloomington; Lyle G. Johnson, Mayer, all of Minn.

[73] Assignee: Seagate Technology, Inc., Scotts Valley, Calif.

[21] Appl. No.: 662,246

[22] Filed: Jun. 14, 1996

Related U.S. Application Data

[60] Provisional application No. 60/009,763, Jan. 8, 1996.

[51] Int. Cl.$^6$ .................................................. G11B 5/60
[52] U.S. Cl. ........................................................ 360/104
[58] Field of Search ..................................... 360/104, 105, 360/103

[56] References Cited

U.S. PATENT DOCUMENTS

| | | | |
|---|---|---|---|
| 5,210,666 | 5/1993 | Chapin et al. | 360/103 |
| 5,331,489 | 7/1994 | Johnson et al. | 360/104 |
| 5,530,606 | 6/1996 | Baasch et al. | 360/104 |

FOREIGN PATENT DOCUMENTS

| | | | |
|---|---|---|---|
| 4-60951 | 2/1992 | Japan | 360/104 |

*Primary Examiner*—Stuart S. Levy
*Assistant Examiner*—Kevin M. Watkins
*Attorney, Agent, or Firm*—Westman, Champlin & Kelley, P.A.

[57] ABSTRACT

A head gimbal assembly includes a gimbal having a first strut and a second strut and a crossmember connected generally between the first and second struts. A gimbal bond tongue has a first end connected to the crossmember and a second end extending from the crossmember. The first and second struts are generally parallel to one another and define a suspension axis. The first end of the gimbal bond tongue is offset from the suspension axis along the crossmember. A slider is coupled to the gimbal bond tongue and a transducer is coupled to the slider.

19 Claims, 3 Drawing Sheets

FLEXURE HAVING DISPLACED GIMBAL BOND TONGUE WITH END TERMINATED HEADS

This application claims benefit of copending provisional application Ser. No. 60/009.763, filed Jan. 8, 1996.

BACKGROUND OF THE INVENTION

The present invention deals with a disc drive. More specifically, the present invention deals with a head gimbal assembly in a disc drive.

A typical disc drive includes one or more magnetic discs mounted for rotation on a hub or spindle. A typical disc drive also includes a transducer supported by a hydrodynamic air bearing (or slider) which flies above each magnetic disc surface. The transducer and the hydrodynamic air bearing are collectively referred to as a data head. A track accessing arm positions the data head over individual tracks on the disc surface.

A gimbal is positioned between the slider and the track accessing arm to provide a resilient connection that allows the slider to follow the topography of the disc. The gimbal includes a dimple that is in point contact with the slider. The dimple provides a point about which the slider can pitch and roll while following the topography of the disc.

As the disc rotates, the disc drags air under the slider and along the air bearing surfaces of the slider in a direction approximately parallel to the tangential velocity of the disc. As the air passes beneath the air bearing surfaces, the skin friction on the air bearing surfaces causes the air pressure between the disc and the air bearing surfaces to increase which creates a hydrodynamic lifting force that causes the slider to lift and fly above the disc surface.

A drive controller is conventionally used for controlling the disc drive system based on commands received from a host system. The drive controller controls the disc drive to retrieve information from the magnetic discs and to store information on the magnetic discs.

An electromechanical actuator operates within a negative feedback, closed-loop servo system. The actuator moves the data head radially over the disc surface for track seek operations and holds the transducer directly over a track on the disc surface for track following operations.

Information is typically stored in concentric tracks on the surface of the magnetic discs by providing a write signal to the data heads to encode flux reversals on the surface of the magnetic disc representing the data to be stored. In retrieving data from the disc, the drive controller controls the electro mechanical actuator so that the data head flies above the magnetic disc, sensing the flux reversals on the magnetic disc, and generating a read signal based on those flux reversals. The read signal is then decoded by the drive controller to recover data represented by flux reversals stored on the magnetic disc, and consequently represented in the read signal provided by the data head.

Prior transducers were formed on the slider and provided with bond pads on the top of the slider (i.e., on the surface of the slider opposite the air bearing surface). These bond pads were referred to as top bond pads (or TBPs) and provided areas suitable for making electrical contact with the transducers. The bond pads were provided on the top of the slider so that they could be more easily connected to electrical conductors (such as wires) which were connected to the remainder of the drive system in order to provide the read and write signals between the drive controller and the transducer. However, due to the fabrication techniques typically employed in forming the slider and the transducer, formation of the top bond pads required the addition of several costly and time consuming manufacturing steps. The manufacturing techniques used in implementing the top bond pads require the addition of extra layers on the slider and a secondary fabrication process to build up these layers. In addition, formation of the top bond pads on the top of the slider required a significant investment in capital equipment to accomplish such manufacturing techniques.

End bond pads have also been implemented on sliders. Such end bonds are provided on the end (as opposed to the top) of the slider. However, the conductors have typically been either connected to the bond pads on the end of the slider and routed back to the remainder of the drive along the edge of the gimbal, or routed up and over the end of the gimbal and run back toward the remainder of the drive. Such arrangements can result in loops in the conductor material which contact the disc surface. This is detrimental to drive performance.

SUMMARY OF THE INVENTION

A head gimbal assembly includes a gimbal having a first strut and a second strut and a crossmember connected generally between the first and second struts. A gimbal bond tongue has a first end connected to the crossmember and a second end extending from the crossmember. The first and second struts are generally parallel to one another and define a suspension axis. The first end of the gimbal bond tongue is offset from the suspension axis along the crossmember. A slider is coupled to the gimbal bond tongue and a transducer is coupled to the slider.

DETAILED DESCRIPTION OF THE PREFERRED EMBODIMENTS

Figure 1:
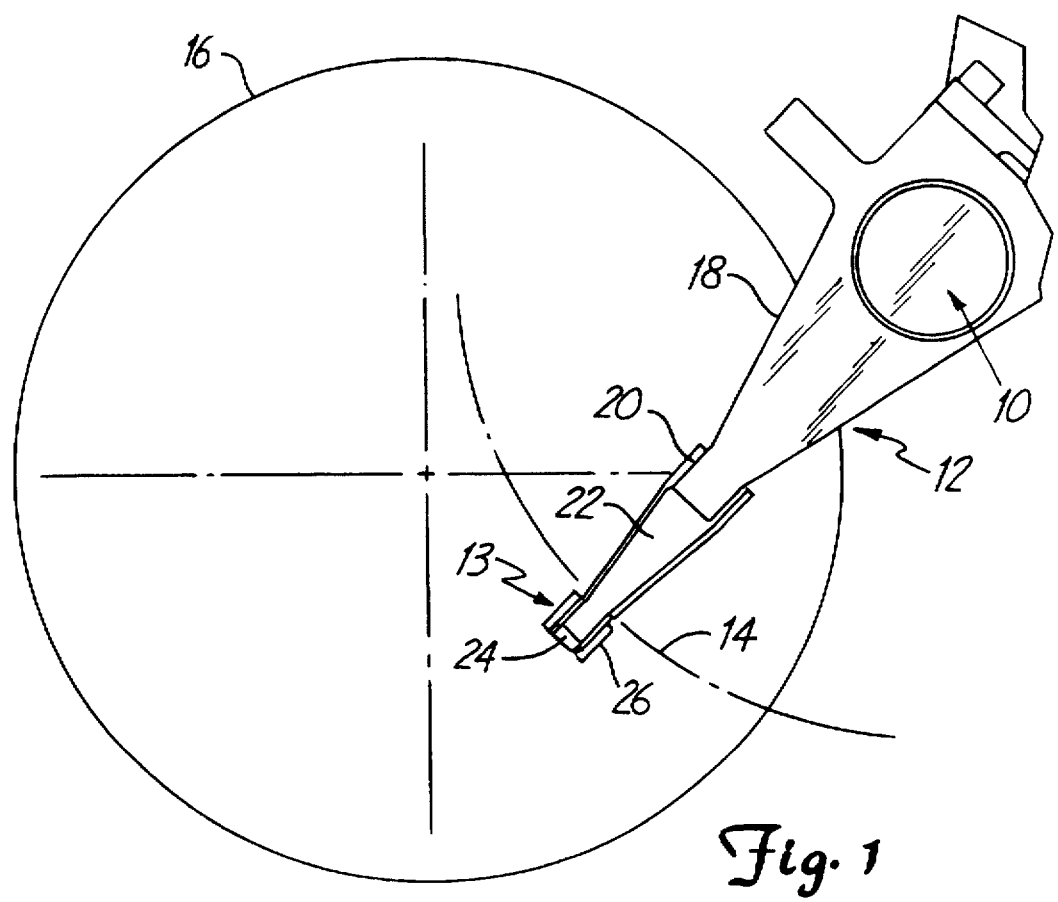
FIG. 1 is a top plan view of a track accessing arm supporting a head gimbal assembly over a rotating disc.

FIG. 1 is a top plan view of a track accessing arm supporting a head gimbal assembly over a rotating disc. Actuator 10 and track accessing arm 12 support head gimbal assembly 13 over disc 16 and move head gimbal assembly 13 along arc 14. Arm 12 includes supporting arm 18, base plate 20 and load beam 22. Head gimbal assembly 13 includes gimbal spring 24, air bearing slider 26 and a transducer (not shown). Gimbal spring 24 resiliently connects air bearing slider 26 to load beam 22 so that slider 26 can follow the topography of disc 16. Slider 26 flies above the surface of disc 16 and carries the transducer to write information to the surface of disc 16 or read information from the surface of disc 16.

Arm 12 is referred to as a rotating actuator arm because actuator 10 rotates arm 12 along arc 14 to position slider 16 over one of the various tracks (not shown) on the surface of disc 16.

Figure 2:
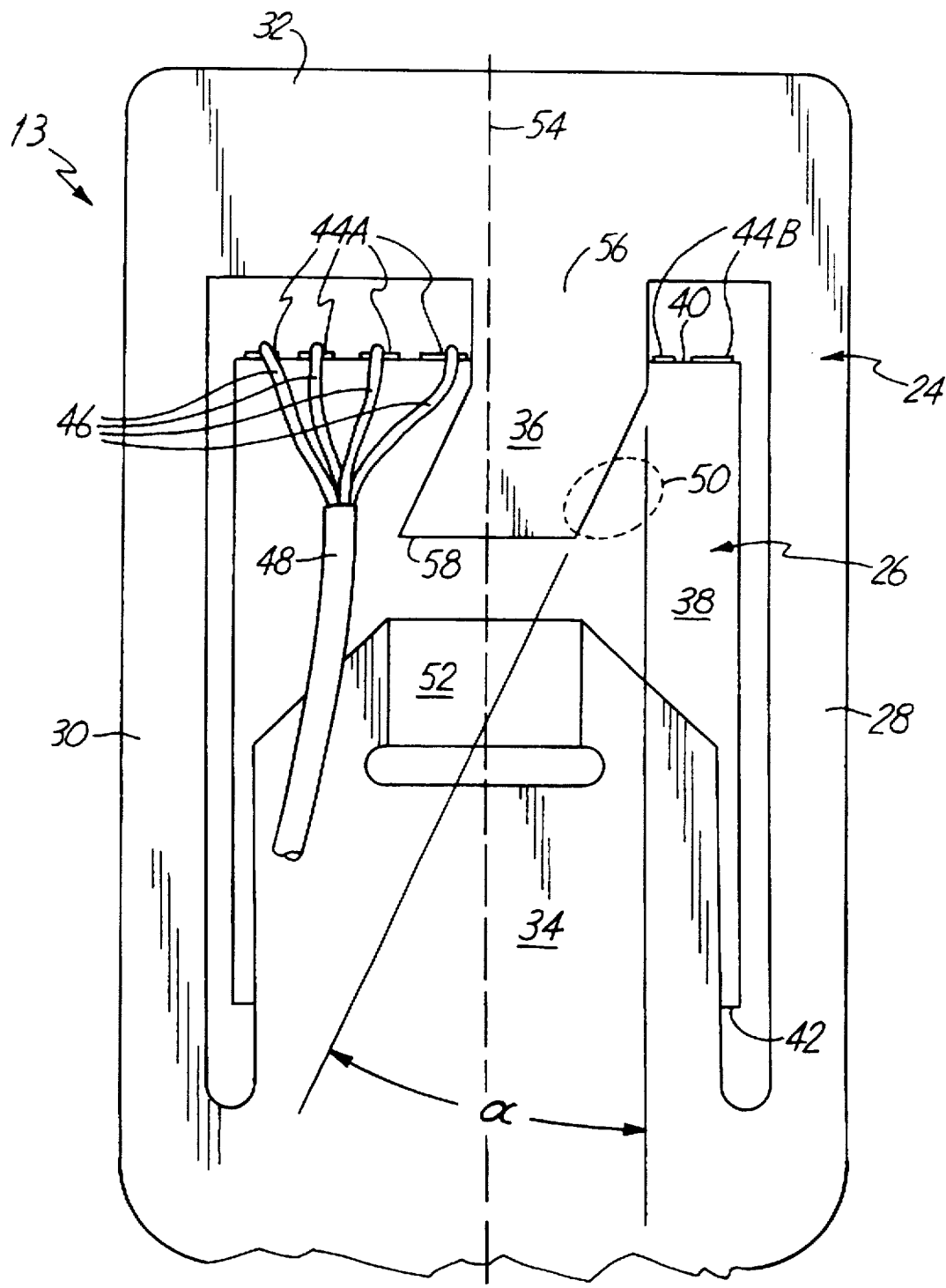
FIG. 2 is a greatly enlarged top view of a portion of a head gimbal assembly according to the present invention.

FIG. 2 is a greatly enlarged top view of head gimbal assembly 13. Similar items are similarly numbered to those shown in FIG. 1. Gimbal 24 includes a first strut 28 and a second strut 30. Struts 28 and 30 are preferably substantially parallel to one another and are connected at first ends thereof by a crossmember 32. Struts 28 and 30 are connected at second ends thereof by a dimple tongue 34. Crossmember 32 has a gimbal bond tongue 36 extending therefrom. Slider 26 has a first major surface (or top surface) 38 and first and second end surfaces 40 and 42, respectively. The first end 40 of slider 26 has a plurality of bond pads 44 disposed thereon. Typically, the first end 40 of slider 26 is provided with two sets of bond pads 44A and 44B, only one set of which is used. In the embodiment shown in FIG. 2, the bond pads 44A arranged on the left side of edge 40 are used and are connected to a plurality of conductors 46. The conductors 46 run back toward the remainder of the disc drive, in the preferred embodiment, within a conductor sleeve 48. The first end 40 of slider 26 also carries the transducer which is coupled to bond pads 44.

The top surface 38 of slider 26 is coupled to gimbal 24 at gimbal bond tongue 36. In the preferred embodiment, the surface of gimbal bond tongue 36 which faces the top surface 38 of slider 26 is provided with an epoxy adhesive which couples gimbal bond tongue 36 to the top surface 38 of slider 26. In addition, in the preferred embodiment, a portion of conductive epoxy material, illustrated by the dashed outline 50 in FIG. 2, is provided over gimbal bond tongue 36 and slider 26 to maintain conductive contact between slider 26 and gimbal bond tongue 36. This maintains slider 26 at a reference potential and precludes slider 26 from electrically "floating" in the head gimbal assembly. In the preferred embodiment, the conductive epoxy is a commercially available silver-filled epoxy material.

In addition, gimbal tongue 34 of gimbal 24 is provided with a dimple 52. Dimple 52 provides substantially a point contact between gimbal tongue 34 of gimbal 24 and the top surface 38 of slider 26. This allows slider 26 to pitch and roll about dimple 52 while following the topography of the surface of disc 16.

FIG. 2 also shows that first and second struts 28 and 30 define what is referred to as a suspension axis 54 which is located at a position centered between, and parallel with, struts 28 and 30. Slider 26 is preferably centered on suspension axis 54.

In prior head gimbal assemblies, the gimbal tongue of the gimbal was substantially centered on crossmember 32 and projected away from crossmember 32 toward dimple tongue 34. With such an arrangement, it was very difficult, if not impossible, to connect conductors 46 to bond pads 44 without running conductors 46 over the top of crossmember 32, or over the side of one of struts 28 and 30. As indicated in the Background portion of the present specification, both of these arrangements had significant disadvantages.

Therefore, with the present invention, gimbal bond tongue 36 is provided with a first end 56 and a second end 58. First end 56 is coupled to, and is preferably integral with, crossmember 32. The second end 58 is the end which extends away from crossmember 32 toward dimple tongue 34. Of note with respect to FIG. 2 is that the first end 56 of gimbal bond tongue 36 is offset from the suspension axis 54 and is moved closer to first strut 28 than to second strut 30 along crossmember 32. However, gimbal bond tongue 36 is formed so that second end 58 extends back in the direction of suspension axis 54.

Since first end 56 is closer to strut 28 than it is to strut 30, the selected set of bond pads 44A is exposed so that conductors 46 can be easily run up through gimbal 24 between gimbal bond tongue 36 and strut 30. This allows conductors 46 to be run back toward the remainder of the drive over the top of gimbal 24 without conductors 46 extending out over the peripheral edges of gimbal 24.

In the preferred embodiment, the first end 56 of gimbal bond tongue 36 is moved off center approximately 0.009 inches from suspension axis 54. This provides clearance for the conductors 46 to exit from the end terminations or bond pads 44 on slider 26 and to be routed up and over the back of gimbal 24. Also, the second end 58 of gimbal bond tongue 36 is extended back toward the suspension axis 54 to allow room to apply the conductive epoxy 50 and also in order to keep the centroid of the gimbal bond area of gimbal bond tongue 36 near the slider center line.

It should also be noted that angling the second end 58 of gimbal bond tongue 36 back toward suspension axis 54 reduces the effect which offsetting of the first end 56 relative to suspension axis 54 has on the crown and camber (or cross curve) of the slider. This also minimizes the affect that the offset has on the flying characteristics of the slider.

In the embodiment shown in FIG. 2, the second end 58 of gimbal bond tongue 36 extends at an angle $\alpha$ relative to the first end 56 of gimbal bond tongue 36. In the preferred embodiment, $\alpha$ is approximately 25°. With this configuration, the centroid of the second end 58 of gimbal bond tongue 36 is near enough to the centerline of slider 26 (i.e., suspension axis 54) to avoid deleterious affects on the flying characteristics of slider 26.

Figure 3:
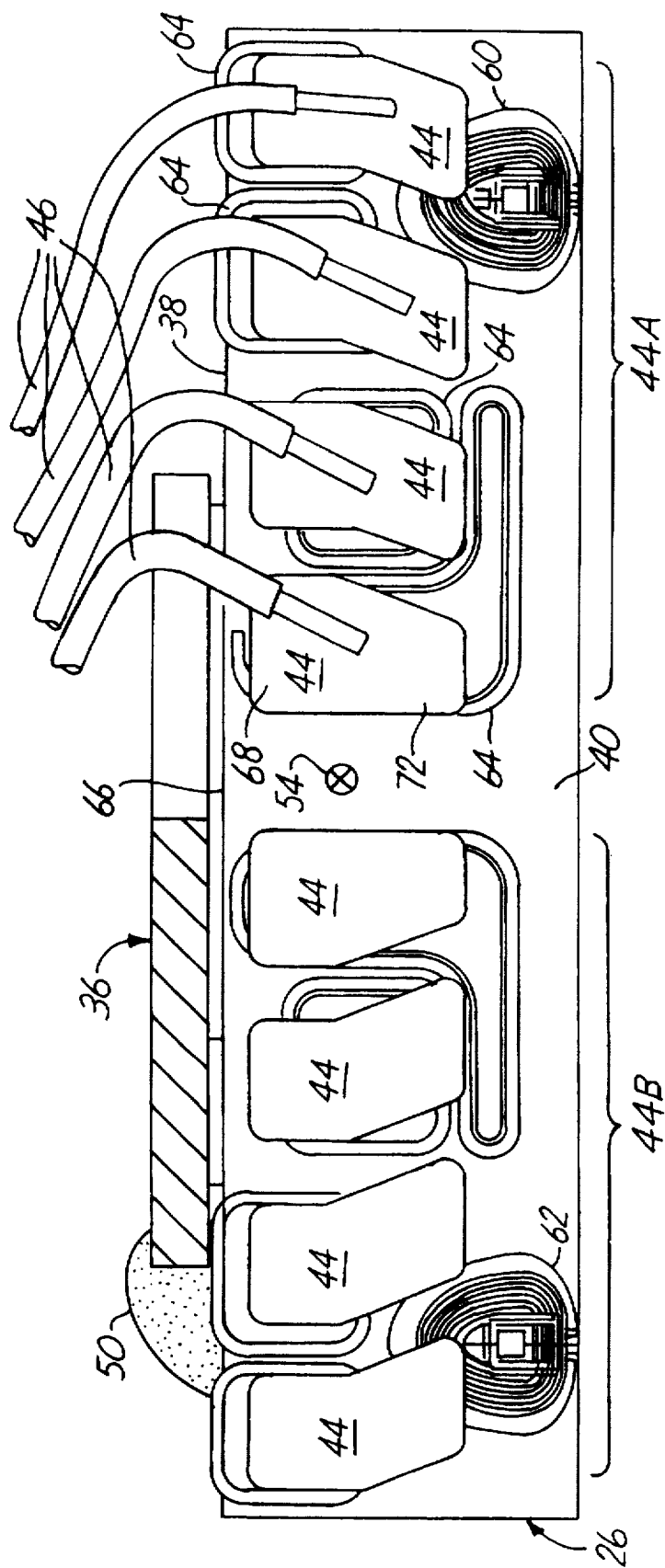
FIG. 3 is an end view of a slider according to the present invention.

FIG. 3 is a view of first end 40 of slider 26 along with a portion of gimbal 24. Similar items are similarly numbered. FIG. 3 also shows a portion of gimbal bond tongue 36.

Bond pads 44 are provided in two sets, 44A and 44B. In the embodiment shown in FIG. 3, set 44A of bond pads 44 is that which is utilized. Also, slider 26 is typically provided with two transducers, such as transducers 60 and 62, only one of which is used. Depending on the particular orientation of slider 26 relative to gimbal 24 and gimbal bond tongue 36, one of sets 44A and 44B of pads 44, and one of transducers 60 and 62 is chosen to be utilized. The transducer and set of bond pads which is exposed (i.e., not covered by gimbal bond tongue 36) is the one which is utilized. In the embodiment shown in FIG. 3, transducer 60 is used along with set 44A of bond pads 44. Each of bond pads 44 is provided with a stud 64 which is connected, through, for example, a printed conductor, to transducer 60. The studs 64 are also in electrical contact with associated bond pads 44. Therefore, the electrical signals carried by conductors 46 are either applied to transducer 60 or received from transducer 60, via the electrical connection (e.g., printed conductors and studs 64) between bond pads 44 and transducer 60.

FIG. 3 also shows that gimbal bond tongue 36 is bonded to surface 38 of slider 26 through the use of an adhesive application 66 which is applied between gimbal bond tongue 36 and surface 38 of slider 26. In the preferred embodiment, adhesive 66 is any commercially available and suitable epoxy material.

It is important that, in attaching conductors 46 to bond pads 44, the conductors do not come into contact with gimbal bond tongue 36. The edges of gimbal bond tongue 36 can be rough or sharp, and can cut through the insulators for conductors 46 and cause short circuits. Therefore, bond pads 44 are oriented in a preferred manner.

In the embodiment shown in FIG. 3, the bond pads 44 have two portions, an upper portion 68 and a lower portion 70. The orientation of these two portions allows conductors 46 to be attached to bond pads 44 in any number of orientations. For example, since the upper portion 68 of bond pads 44 is substantially vertical as shown in FIG. 3, conductors 46 can be attached in a vertical manner, such as the conductor shown on the far right in FIG. 3. However, since it is important that conductors 46 avoid contact with the edge of gimbal bond tongue 36, it is desirable that conductors 46 be attached at an angle relative to a vertical axis in FIG. 3 so that conductors 46 first extend away from gimbal bond tongue 36 and then back toward the remainder of the drive. Therefore, the lower portion 72 of bond pads 44 is oriented at an angle away from the vertical central axis of slider 26. This allows conductors 46 to be attached at various angles so that they can first extend away from the gimbal bond tongue 36 after they leave bond pads 44. In the preferred embodiment, bond pads 44 have portion 72 which extends upwardly toward the upper surface 38 of slider 26 and also outwardly toward the adjacent strut, 28 or 30, to accommodate various angles of attachment for conductors 46.

Bonding conductors 46 to bond pads 44 at an angle may require the conductor to be bonded lower on bond pad 44 in region 72, while bonding in a vertical direction may require the conductor to be bonded higher, in region 68. However, this is a relatively easy adjustment.

Tests have been conducted using a gimbal and slider according to the present invention, and it has shown no significant performance difference over the top bond pad design previously used. Also, it should be noted that gimbal 24 is preferably one integral piece formed into the desired shape.

Although the present invention has been described with reference to preferred embodiments, workers skilled in the art will recognize that changes may be made in form and detail without departing from the spirit and scope of the invention.

What is claimed is:

1. A head gimbal assembly, comprising:

a gimbal having a first strut with a first end and a second end, a second strut having a first end and a second end, a crossmember connected generally between the first ends of the first and second struts, and a gimbal bond tongue having a first end connected to the crossmember and a second end extending from the crossmember, the gimbal having a central axis located substantially parallel to and centrally between the first and second struts, the first end of the gimbal bond tongue having a central portion thereof, measured in a direction generally parallel to the crossmember, offset from the central axis in a direction toward the first strut along the crossmember, and a central region of the second end of the gimbal bond tongue, measured in a direction substantially parallel to the crossmember, is substantially aligned with the central axis;

a slider coupled to the second end of the gimbal bond tongue; and a transducer coupled to the slider.

2. The head gimbal assembly of claim 1 and further comprising:

a plurality of bond pads coupled to the slider and to the transducer.

3. The head gimbal assembly of claim 2 wherein the slider has a first end surface and a second end surface and a first side surface extending between the first and second end surfaces thereof, the gimbal bond tongue being coupled to the first side surface of the slider and the plurality of bond pads being disposed on the first end surface of the slider and wherein the crossmember has a pair of generally opposing edges extending between the first ends of the first and second struts, the edges being located beyond the first end surface of the slider along the central axis to leave a space between the crossmember and the first end surface of the slider along the central axis.

4. The head gimbal assembly of claim 3 wherein the gimbal bond tongue has a first edge that extends from the first end thereof to the second end thereof and that extends away from the crossmember in a direction toward a central region of the first side surface of the slider.

5. The head gimbal assembly of claim 4 wherein the gimbal bond tongue has a second edge, generally parallel to the first edge, and central region between the first and second edges and generally parallel to the first and second edges, the central region being angled at an angle greater than 0 degrees at a point between the first and second ends of the gimbal bond tongue to extend in the direction toward the central region of the first side surface of the slider.

6. The head gimbal assembly of claim 3 wherein at least some of the plurality of bond pads are oriented on the first end surface of the slider to at least partially extend in a direction toward the first side surface of the slider and toward the second strut.

7. The head gimbal assembly of claim 3 and further comprising:

a plurality of conductors having first ends electrically connected to the pads and extending between the gimbal bond tongue and the second strut.

8. The head gimbal assembly of claim 1 wherein the gimbal bond tongue is formed integrally with the crossmember.

9. The head gimbal assembly of claim 1 wherein the gimbal is formed as one integral piece.

10. The head gimbal assembly of claim 1 and further comprising:

a dimple tongue extending generally between the second ends of the first and second struts.

11. The head gimbal assembly of claim 1 wherein the first and second struts generally define a suspension axis substantially coinciding with the central axis and wherein the first end of the gimbal bond tongue is offset from the suspension axis and the second end of the gimbal bond tongue is substantially aligned with the suspension axis.

12. The head gimbal assembly of claim 1 and further comprising:

conductive epoxy material contacting the gimbal bond tongue and the first side surface of the slider.

13. A head gimbal assembly, comprising:

a gimbal having a first strut with a first end and a second end, a second strut having a first end and a second end, a crossmember connected generally between the first ends of the first and second struts, and a gimbal bond tongue having a first end connected to the crossmember and a second end extending from the crossmember, the first and second struts being generally parallel to one another and defining a suspension axis substantially centered between the first and second struts and being parallel to the first and second struts, the first end of the gimbal bond tongue having a central region thereof, measured in a direction parallel to the crossmember, which is offset from the suspension axis along the crossmember, and a central region of the second end of the gimbal bond tongue, measured in a direction substantially parallel to the crossmember, is substantially aligned with the suspension axis;

a slider coupled to the second end of the gimbal bond tongue; and a transducer coupled to the slider.

14. The head gimbal assembly of claim 13 wherein the first end of the gimbal bond tongue is located along the crossmember closer to the first strut than to the second strut, wherein the slider has a first end surface and a second end surface and a first side surface extending between the first and second end surfaces thereof, the gimbal bond tongue being coupled to the first side surface of the slider, and further comprising:

a plurality of bond pads being disposed on the first end surface of the slider, each of the plurality of bond pads, each of the plurality of bond pads having a first and second end, the first end being closer to the first side surface than the second end, and each of the plurality of bond pads being oriented on the first end surface of the slider to have edges which extend between the first end thereof and the second end thereof and which at least partially extend in a direction toward the first side surface of the slider and toward the second strut.

15. The head gimbal assembly of claim 14 and further comprising:

a plurality of conductors having first ends electrically connected to the pads and extending between the gimbal bond tongue and the second strut.

16. The head gimbal assembly of claim 13 wherein the gimbal bond tongue is angled at a point between the first and second ends thereof to extend in the direction toward the suspension axis.

17. The head gimbal assembly of claim 13 wherein the gimbal is formed as one integral piece.

18. The head gimbal assembly of claim 13 and further comprising:

conductive epoxy material contacting the gimbal bond tongue and the first side surface of the slider.

19. A head gimbal assembly, comprising:

a gimbal having first and second struts connected to one another at first ends thereof by a crossmember, and connected to one another at second ends thereof by a dimple tongue, the gimbal having a gimbal tongue extending from the crossmember;

a slider having first and second end surfaces and a first major surface between the first and second end surfaces, the first major surface of the slider being coupled to the gimbal tongue, and having a second major surface opposite the first major surface;

a transducer coupled to the slider; and a plurality of bond pads being disposed on the first end surface of the slider, the plurality of bond pads being oriented on the first end surface of the slider to at least partially extend in a direction toward the first major surface of the slider and the bond pads having edges which extend generally toward one of the first and second struts and away from another of the first and second struts as the edges travel in a direction from the second major surface toward the first major surface.

* * * * *